(12) United States Patent
Li et al.

(10) Patent No.: US 8,165,158 B2
(45) Date of Patent: Apr. 24, 2012

(54) METHOD/SYSTEM FOR PROCESSING MESSAGES AND CONVERGED SERVICE SYSTEM

(75) Inventors: Fengjun Li, Shenzhen (CN); Ali Ghazanfar, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 0 days.

(21) Appl. No.: 13/122,925

(22) PCT Filed: Dec. 24, 2008

(86) PCT No.: PCT/CN2008/073689
§ 371 (c)(1),
(2), (4) Date: Apr. 6, 2011

(87) PCT Pub. No.: WO2010/045570
PCT Pub. Date: Apr. 29, 2010

(65) Prior Publication Data
US 2011/0194463 A1    Aug. 11, 2011

(30) Foreign Application Priority Data

Oct. 23, 2008  (CN) .......................... 2008 1 0172969

(51) Int. Cl.
*H04L 12/56* (2006.01)
*H04J 1/16* (2006.01)
(52) U.S. Cl. .......................... 370/467; 370/252; 370/389
(58) Field of Classification Search .................. 370/252, 370/389, 467
See application file for complete search history.

(56) References Cited

U.S. PATENT DOCUMENTS

| 6,445,919 | B1 | 9/2002 | Suonvieri | |
|---|---|---|---|---|
| 2006/0022048 | A1* | 2/2006 | Johnson | ..................... 235/462.1 |

FOREIGN PATENT DOCUMENTS

| CN | 1681332 A | 10/2005 |
|---|---|---|
| CN | 101022483 A | 8/2007 |
| CN | 101068199 A | 11/2007 |

(Continued)

OTHER PUBLICATIONS

Simon S. Lam, "Protocol Conversion", Mar. 1988, IEEE Transactions on Software Engineering, vol. 14, No. 3.*

(Continued)

*Primary Examiner* — John Pezzlo
(74) *Attorney, Agent, or Firm* — Oppedahl Patent Law Firm LLC

(57) ABSTRACT

A method/system for processing messages and a converged service system are provided. The method for processing messages comprises: a converged service system receives a message request sent from a traditional message service user via a traditional message service system and performs a converged service message format conversion on the message request (step S102); the converged service system determines an ID of the traditional message service system sending the message request according to the message request, and sends a converged service user the ID of the traditional message service system included in the converted message request (step S104); the converged service system receives a predefined service message from the converged service user, wherein the ID of the traditional message service system is included in the predefined service message (step S106); the converged service system performs a traditional message service format conversion on the predefined service message and sends the converted predefined service message to a traditional message service system corresponding to the ID of the traditional message service system in the predefined service message (step S108). By using the invention, the service experience of the user is improved.

29 Claims, 5 Drawing Sheets

FOREIGN PATENT DOCUMENTS

WO             9909708 A2     2/1999

OTHER PUBLICATIONS

International Search Report in international application No. PCT/CN2008/073689, mailed on Aug. 6, 2009.

English Translation of the Written Opinion of the International Search Authority in international application No. PCT/CN2008/073689, mailed on Aug. 6, 2009.

Notification of the First Office Action of Chinese application No. 200810172969.1, issued on Mar. 24, 2011.

\* cited by examiner

METHOD/SYSTEM FOR PROCESSING MESSAGES AND CONVERGED SERVICE SYSTEM

CROSS-REFERENCE TO RELATED APPLICATIONS

This application is the U.S. National Stage of International Patent Application No. PCT/CN2008/073689 filed on Dec. 24, 2008, which claims priority to Chinese Patent Application Number 200810172969.1 filed on Oct. 23, 2008, the disclosures of which are hereby incorporated by reference in their entirety.

TECHNICAL FIELD

The present invention relates to the field of communications, particularly to a method/system for processing messages and a converged service system.

BACKGROUND

With the development of IP-based networks, traditional telecom services need to be transferred towards IP-based next-generation networks. At present, standards organizations such as 3rd Generation Partnership Project (3GPP), 3rd Generation Partnership Project 2 (3GPP2) and Telecommunications and Internet Converged Services and Protocols for Advanced Networking (TISPAN) all regard Session Initiation Protocol (SIP) as a basic protocol of a next-generation core network and consider an SIP-based IP network as a network foundation of service applications. A converged service system is a new system architecture based on a next-generation network. In a converged service system, various networks with different structures coexist and can be interconnected and realize seamless connection and handover, wherein realizing a group session through an SIP-based network is one of the main functions of a converged service system.

An SIP-based converged service system supports not only a message exchange between converged service users but also a message exchange between a converged service user and a traditional message service user. During a message exchange between a traditional message service user and a converged service user, when the traditional message service user sends a message to the converged service user and requires a return receipt or a reading report from the converged service user, the diversity of traditional message service systems makes the return receipt or reading report from a converged service system unable to be correctly sent to the corresponding traditional message service system, resulting in the traditional message service user unable to correctly receive the return receipt or reading report from the converged service user and going against the service experience of the user.

SUMMARY

In consideration of the problem that a traditional message service user is unable to correctly receive a return receipt or a reading report from a converged service user in related art, which goes against the service experience of the user, the present invention is provided. Therefore, a main objective of the present invention is to provide an improved message processing solution to solve the above-mentioned problems.

In order to realize the above-mentioned objective, according to an aspect of the present invention, a method for processing messages is provided, which is used for performing a message exchange between a traditional message service user and a converged service user via a converged service system and a traditional message service system.

The method for processing messages according to the present invention comprises: the converged service system receives a message request sent from the traditional message service user via the traditional message service system and performs a converged service message format conversion on the message request; the converged service system determines an ID of the traditional message service system sending the message request according to the message request, and sends the ID of the traditional message service system included in the converted message request to the converged service user; the converged service system receives a predefined service message from the converged service user, wherein the ID of the traditional message service system is included in the predefined service message; and the converged service system performs a traditional message service format conversion on the predefined service message and sends the converted predefined service message to a traditional message service system corresponding to the ID of the traditional message service system in the predefined service message.

According to an aspect of the present invention, a method for processing messages is provided, which is used for performing a message exchange between a user of a first service system and a user of a second service system via the first service system and the second service system.

The method for processing messages according to the present invention comprises: the second service system receives a message request sent from the user of the first service system via the first service system; the second service system determines an ID of the first service system sending the message request according to the message request and sends the user of the second service system the ID of the first service system included in the message request; the second service system receives a predefined service message from the user of the second service system, wherein the ID of the first service system is included in the predefined service message; and the second service system sends the predefined service message to a first service system corresponding to the ID of the first service system in the predefined service message.

According to another aspect of the present invention, a converged service system is provided.

The converged service system according to the present invention comprises an exchange unit and an exchange selection unit. The exchange unit comprises: a first receiving module, which is used for receiving a message request sent from a traditional message service user via a traditional message service system; a first conversion module, which is used for performing a converged service message format conversion on the message request in the first receiving module; a determination module, which is used for determining an ID of the traditional message service system sending the message request according to the message request in the conversion module; a first sending module, which is used for sending the message request in the first conversion module to a converged service user, wherein the message includes the ID of the traditional message service system in the determination module; a second receiving module, which is used for receiving a predefined service message from the exchange selection unit, wherein the predefined service message includes the ID of the traditional message service system; a second conversion module, which is used for performing a traditional message service format conversion on the predefined service message coming from the second receiving module; and a second sending module, which is used for sending the predefined service message in the second conversion module to the exchange selection module; and the exchange selection unit comprises: a third receiving module, which is used for receiving the predefined service message from the converged service user; a determination module, which is used for determining a corresponding exchange unit according to the ID of the traditional message service system included in the predefined service message; and a third sending module, which is used for sending the predefined service message to the corresponding exchange unit.

According to another aspect of the present invention, a system for processing messages is provided.

The system for processing messages according to the present invention comprises a traditional message service system and the above-mentioned converged service system.

Through at least one of the above-mentioned technical solutions of the present invention and through introducing the ID of a traditional message system into a corresponding message transmission flow, the problem that a traditional message service user is unable to correctly receive a return receipt or a reading report from a converged service user is solved and the service experience of the user is improved.

BRIEF DESCRIPTION OF THE DRAWINGS

The drawings are intended to provide further understanding to the present invention and constitute one part of the description. The drawings and the embodiments of the present invention together are used to illustrate but not to limit the present invention. In the drawings.

DETAILED DESCRIPTION

Function Overview

Currently, due to the diversity of traditional message service systems, during a message exchange between a traditional message service user and a converged service user, the traditional message service user may be unable to correctly receive a return receipt or a reading report from the converged service user. To address this problem, the basic concept of the present invention comprises: a converged service system identifies a traditional message service system according to a message sent by a is traditional message service user via the traditional message service system, determines an ID of the traditional message service system and sends the ID to a converged service user, so that when the converged service user sends a return receipt and a reading report to the traditional message service user via the converged service system, the converged service system can identify the corresponding traditional message service system.

If there is no conflict, the embodiments of the present invention and the characteristics shown in the embodiments may be combined.

The present invention will be described with reference to the drawings.

Method Embodiment 1

According to an embodiment of the present invention, a method for processing a message return receipt and a reading report is provided.

It should be noted that for easy description, the technical solution of the method embodiment of the present invention is shown and described in the form of steps below, and the steps shown below may be executed in a computer system in which instructions are executable by a group of computers. A logic sequence is illustrated in the related drawings, but in some cases, the illustrated or described steps may be executed in a sequence different from this sequence.

Figure 1:
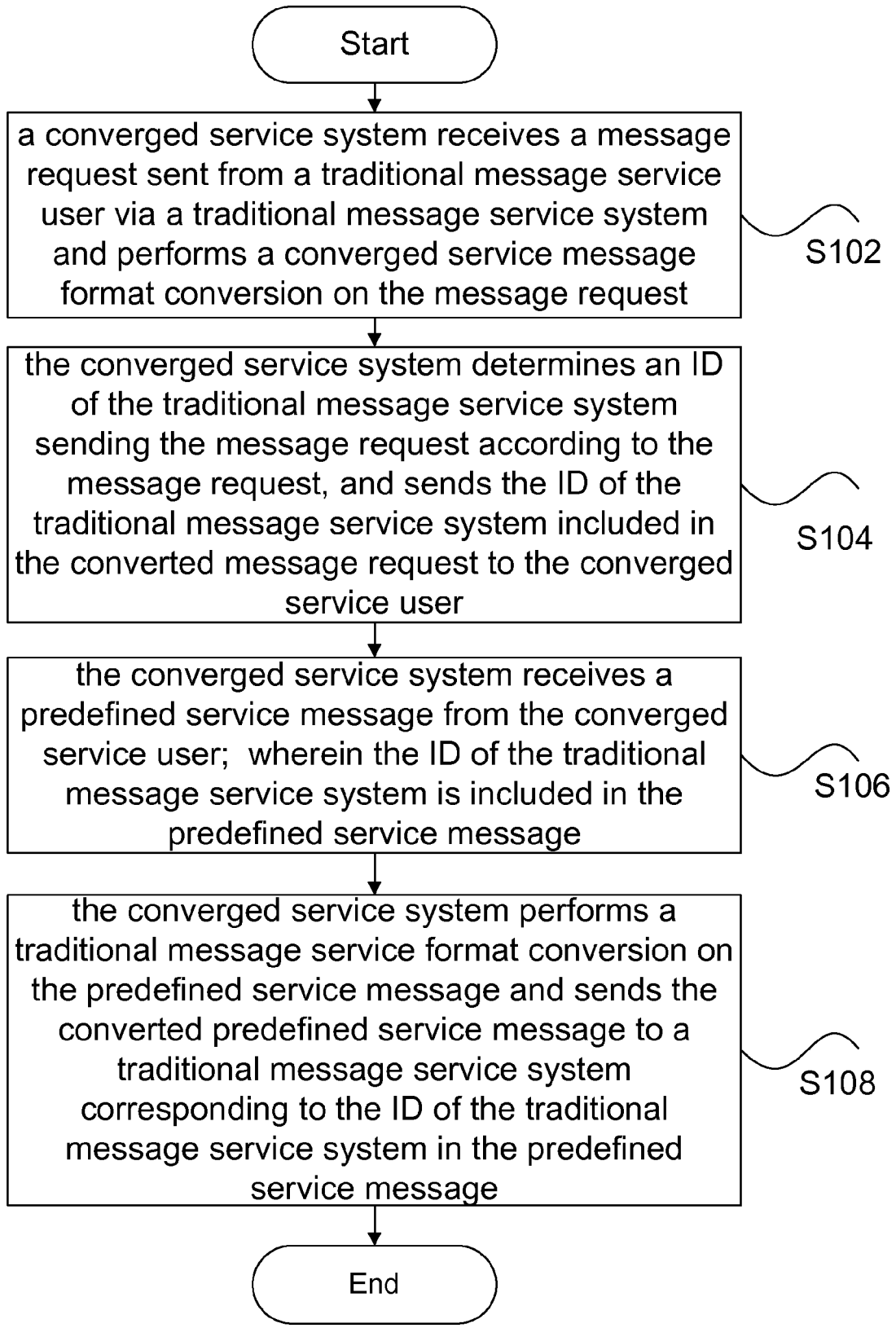
FIG. 1 is a flow chart of a method for processing messages according to a method embodiment of the present invention.

FIG. 1 is a flow chart of a method for processing a message return receipt and a reading report according to an embodiment of the present invention. The method is used for performing a message exchange between a traditional message service user and a converged service user via a converged service system and a traditional message service system. As shown in FIG. 1, the method comprises the following processing (S102-S108).

S102: a converged service system receives a message request sent from a traditional message service user via a traditional message service system and performs a converged service message format conversion on the message request; wherein the message request includes an ID of the converged service user, an ID of the predefined service and content of the message.

S104: the converged service system determines an ID of the traditional message service system sending the message request according to the message request, and sends the ID of the traditional message service system included in the converted message request to the converged service user; and the converged service user generates a corresponding predefined service message according to the ID of the predefined service and the content of the message, and sends the predefined service message of the converged service user to the converged service system.

S106: the converged service system receives a predefined service message from the converged service user; wherein the ID of the traditional message service system is included in the predefined service message.

S108: the converged service system performs a traditional message service format conversion on the predefined service message and sends the converted predefined service message to a traditional message service system corresponding to the ID of the traditional message service system in the predefined service message; and the traditional message service system sends the predefined service message to the traditional message service user.

Through the technical solution provided by the embodiment of the present invention and through introducing the ID of a traditional message system into a corresponding message transmission flow, the problem that a traditional message service user is unable to correctly receive a return receipt or a reading report from a converged service user is solved and the service experience of the user is improved.

Figure 2:
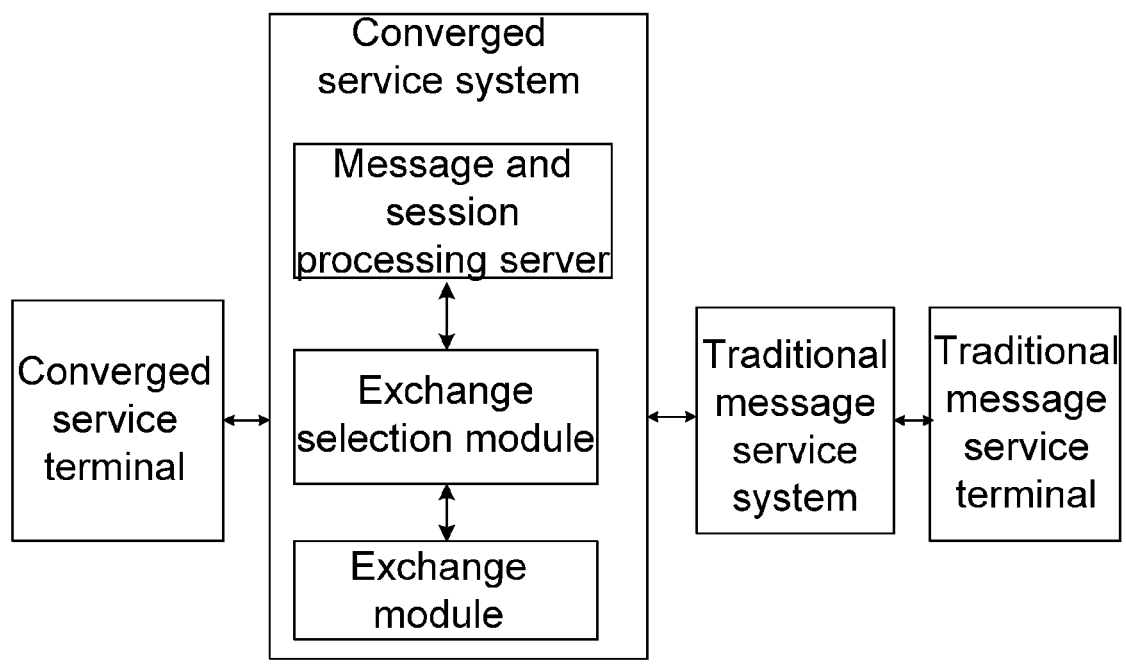
FIG. 2 is a structure block diagram of a service environment in which messages are processed according to an embodiment of the present invention.

The method described in FIG. 1 will be illustrated below in connection with an embodiment. For easy understanding of the embodiment of the present invention, the application scenario of the embodiment will be explained before the embodiment is illustrated. FIG. 2 shows a structure block diagram of a method for realizing message processing. As shown in FIG.

2, the service environment mainly comprises a converged service terminal, a converged service system, a traditional message service system and is a traditional message service terminal.

The converged service terminal provides various kinds of converged service applications for users; the converged service system mainly comprises a message and session processing server, an exchange selection module and an exchange module. The message and session processing server is used for receiving and sending the message and session information of the converged service terminal, and distributes or routes the message or session request to the traditional message service system. The exchange selection module is used for determining which traditional message service is adopted to send the message to the traditional message service user according to the content of the message, a destination address type and other information. The exchange module is used for implementing a format conversion and a transmission protocol conversion between a converged service message and a traditional message. The traditional message service system provides traditional users with traditional message service functions, such as short message service and multimedia message service, etc.

Figure 3:
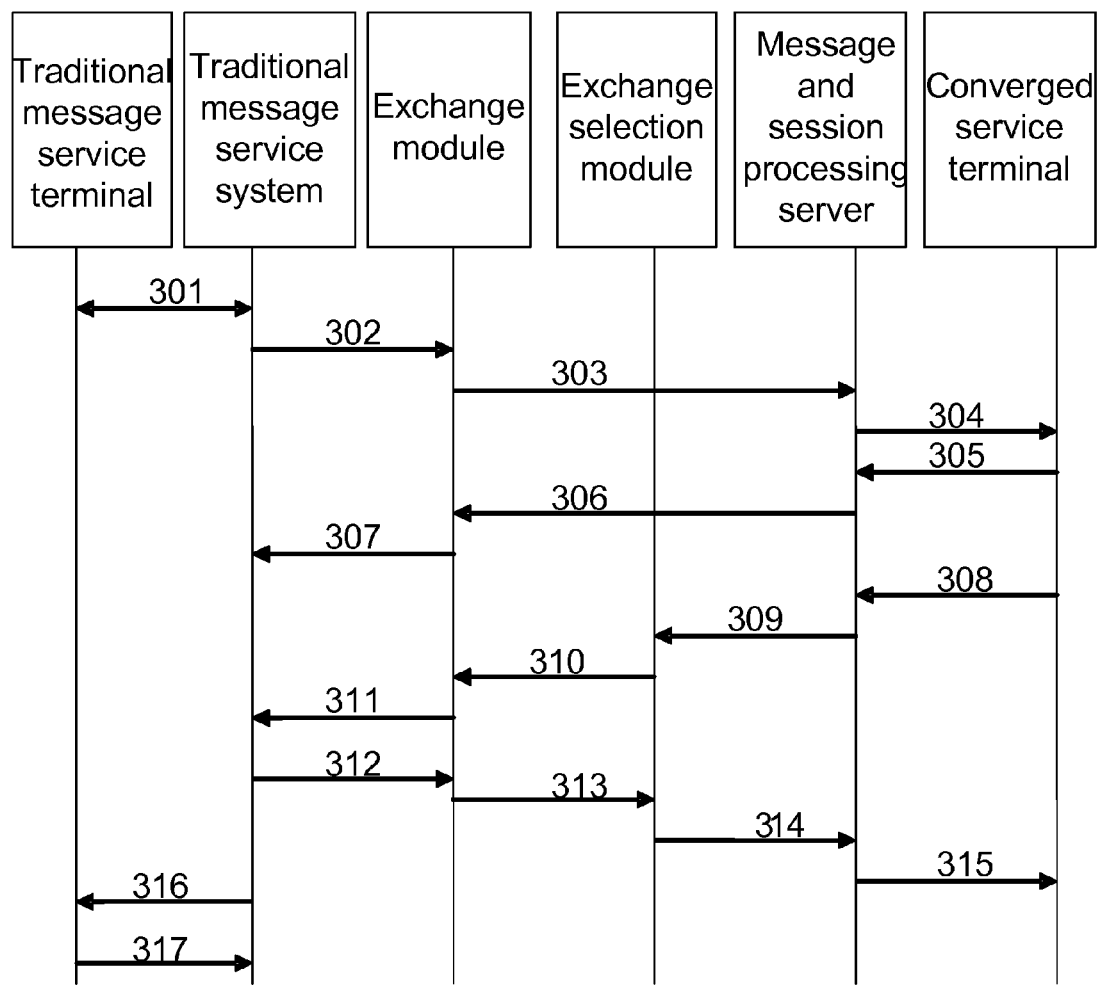
FIG. 3 is a detailed processing flow chart of a method for processing messages according to an embodiment of the present invention.

FIG. 3 is a detailed processing flow chart of the method shown in FIG. 1. The present invention is illustrated below by supposing the predefined service is a return receipt or a reading report. As shown in FIG. 3, the method comprises the following processing (301-317).

301: a traditional message service user sends a message request to a converged service user and requires the converged service user to feed back a return receipt or a reading report; first of all, a traditional message service terminal sends a message request to a traditional message service system, wherein the message request includes content of the message, an ID of the return receipt or an ID of the reading report, an ID of the converged service user and an ID of the traditional service user, wherein the ID of the converged service user may be a mobile phone number of the converged service user.

302: the traditional message service system obtains the message request coming from the converged service user, determines according to the ID of the converged service user in the message request that the user is a converged service user, and is forwards the message request to the exchange module of the converged service system.

303: the exchange module obtains the message request coming from the traditional message service system (corresponding to step S102) and converts the message request into a message format identifiable to the converged service system, i.e. a message format required by the converged service system; for example, under the circumstance that the ID of the converged service user is a mobile phone number, the mobile phone number is converted into address information that can be routed under a converged service environment, and a preferred processing method comprises: establishing a one-to-one correspondence between a mobile phone number of the converged service user and address information under a converged service environment in advance, i.e. each mobile phone number of the converged service user corresponds to only one address information in the converged service system, adding the ID to which the traditional message service system corresponds into the converted message request, and sending the message request to the message and session processing server (corresponding to step S104).

304: the message and session processing server obtains the message request coming from the exchange module and sends the message request to a corresponding converged service user terminal according to the ID of the converged service user in the message request.

305: the converged service user terminal receives the message request coming from the message and session processing server, obtains the ID of the traditional message service system, the content of the message, the ID of the return receipt or the ID of the reading report in the message request and returns a response message to the message and session processing server.

306: the message and session processing server obtains the response message coming from the converged service user terminal and forwards the response message to the exchange module.

307: the exchange module converts the response message coming from the message and session processing server into a message format required by the is traditional message service system, then it sends the converted response message to the traditional message service system through a transmission protocol required by the traditional message service system.

308: the converged service user terminal judges according to the ID of the return receipt or the ID of the reading report in the message request that the traditional message service user requires it to feed back a return receipt or a reading report, so it generates information of the return receipt or reading report and sends a service feedback message (i.e. the predefined service message described above) to the message and session processing server; the service feedback message includes the ID of the traditional message service system, the information of the return receipt or reading report, and the ID of the traditional service user.

309: the message and session processing server obtains the service feedback message coming from the converged service user terminal (corresponding to step S106), judges that the message is a return receipt or a reading report, and that the user is a traditional message service user according to the ID of the traditional message service system in the message, and then forwards the service feedback message to the exchange selection module.

310: the exchange selection module obtains the service feedback message coming from the message and session processing server and judges the content in the service feedback message is information of a return receipt or a reading report, then according to the ID of the traditional message service system included in the service feedback message, it determines the traditional message service system corresponding to the ID, thereby determining the corresponding exchange module. During concrete implementation, if there are multiple exchange modules, then an exchange module corresponding to the determined traditional message service system will be selected and the service feedback message will be sent to the corresponding exchange module; if there is only one exchange module, then the service feedback message will be directly sent to the exchange module.

311: the exchange module obtains the service feedback message coming from the exchange selection module, converts the content of the return receipt or reading report into a message format identifiable to the traditional message service system according to the ID of the traditional message service system included in the message, and sends the content of the converted return receipt or reading report to the traditional message service system through a corresponding transmission protocol (corresponding to step S108).

312: the traditional message service system obtains the content of the return receipt or reading report coming from the exchange module, and returns a response message to the exchange module.

313: the exchange module obtains the response message coming from the traditional message service system, converts the response message into a message format identifiable to the converged service system, and sends the converted response message to the exchange selection module.

314: the exchange selection module receives the response message coming from the exchange module, and forwards the response message to the message and session processing server.

315: the message and session processing server obtains the response message coming from the exchange selection module and forwards the response message to the converged service user terminal.

316: the traditional message service system determines a corresponding traditional message service user according to the ID of the traditional message service user, and sends the content of the return receipt or reading report to the terminal of the determined traditional message service user.

317: after the traditional message service user terminal obtains the content of the return receipt or reading report coming from the traditional message service system, it returns a response message to the traditional message service system.

Method Embodiment 2

According to an embodiment of the present invention, a method for processing converged messages is provided, which is used for performing a message exchange is between a user of a first service system and a user of a second service system via the first service system and the second service system.

The method for processing converged messages according to the embodiment of the present invention comprises: a second service system receives a message request sent from a user of a first service system via the first service system; the second service system determines an ID of the first service system sending the message request according to the message request and sends a user of the second service system, the ID of the first service system included in the message request; the second service system receives a predefined service message from the user of the second service system, wherein the ID of the first service system is included in the predefined service message; after the second service system sends the predefined service message to a first service system corresponding to the ID of the first service system in the predefined service message, the corresponding first service system sends the predefined service message to the user of the first service system.

Wherein, the above-mentioned message request includes an ID of the user of the second service system, an ID of the predefined service and content of the message. The above-mentioned ID of the predefined service comprises at least one of the following IDs: an ID of the return receipt and an ID of the reading report.

It should be noted that the above-mentioned first service system may be a traditional message service system, and the second service system may be a converged service system, but they are not limited to these. Other service systems implementing the embodiments of the present invention are still within the protection scope of the present invention.

System Embodiment 1

According to an embodiment of the present invention, a converged service system is provided.

Figure 4:
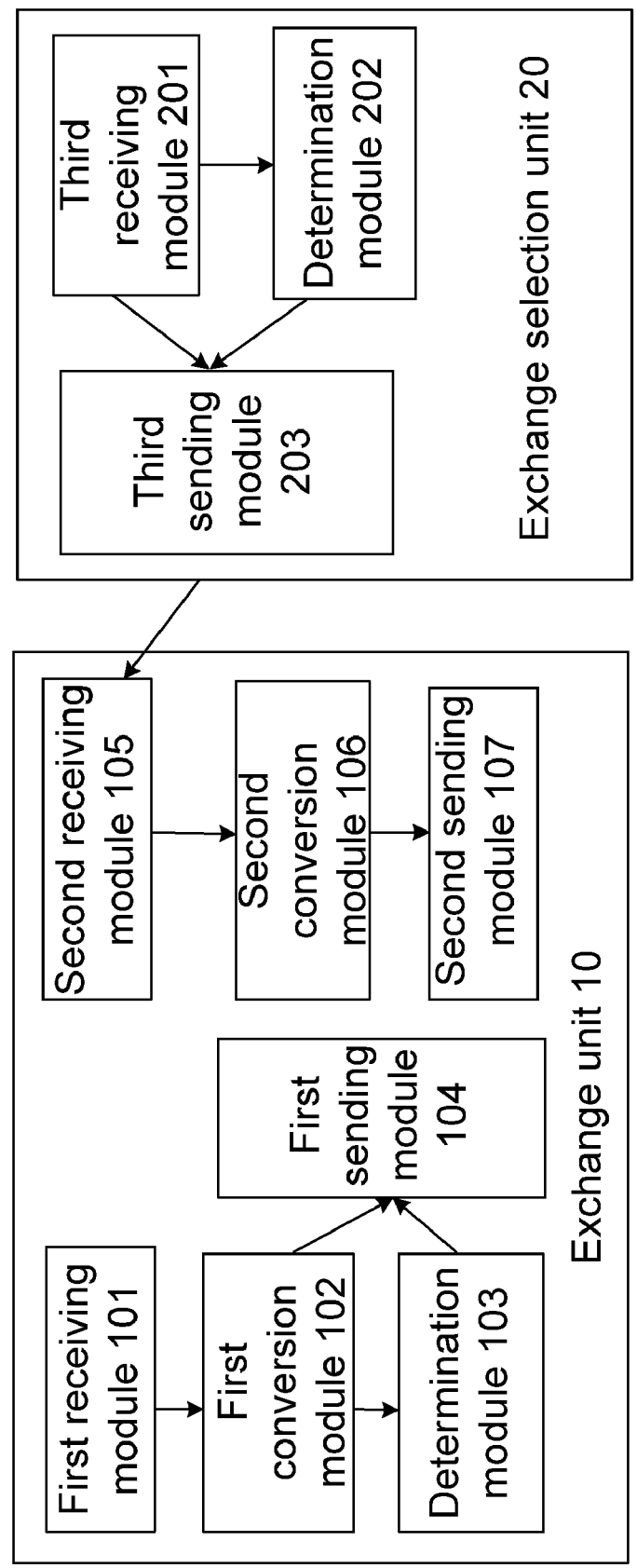
FIG. 4 is a structure block diagram of a converged service system according to a system embodiment of the present invention.

FIG. 4 shows a structure block diagram of a converged service system according to an embodiment of the present invention. As shown in FIG. 4, the system comprises an exchange unit 10 and an exchange selection unit 20.

Below the functions of the above-mentioned units are described in details.

The exchange unit 10 comprises a first receiving module 101, a first conversion module 102, a determination module 103, a first sending module 104, a second receiving module 105, a second conversion module 106 and a second sending module 107.

The first receiving module 101 is used for receiving a message request sent from a traditional message service user via a traditional message service system. The first conversion module 102 connected to the first receiving module 101 is used for performing a converged service message format conversion on the message request in the first receiving module 101. The determination module 103 connected to the first conversion module 102 is used for determining an ID of the traditional message service system according to the message request in the first conversion module 102. The first sending module 104 connected to the first conversion module 102 and the determination module 103 is used for sending the message request in the first conversion module 102 to a converged service user, wherein the message request includes the ID of the traditional message service system determined by the determination module 103. The second receiving module 105 is used for receiving a predefined service message from the exchange selection unit, wherein the predefined service message includes the ID of the traditional message service system. The second conversion module 106 connected to the second receiving module 105 is used for performing a traditional message service format conversion on the predefined service message coming from the second receiving module 105.

The second sending module 107 connected to the second conversion module 106 is used for sending the predefined service message converted by the second conversion module 106 to the traditional message service user. The exchange selection unit 20 comprises a third receiving module 201, a determination module 202 and a third sending module 203. The third receiving module 201 is used for receiving the predefined service message from the converged service user. The determination module 202 connected to the third receiving module 201 is used for determining a corresponding exchange unit according to the ID of the traditional message service system included in the predefined service message in the third receiving module 201. The third sending module 203 connected to the second receiving module 105 is used for sending the predefined service message to the corresponding exchange unit.

Further, the system may also comprise a message and session processing server, which is used for realizing a message exchange between a converged service user and the exchange module, or a message exchange between a converged service user and the exchange selection module.

It should be noted that the first receiving module 101 and the second receiving module 105 may be set in one, the first conversion module 102 and the second conversion module 106 may be set in one, and the first sending module 104 and the second sending module 107 may be set in one.

Through the converged service system provided by an embodiment of the present invention and through introducing the ID of a traditional message system into a corresponding message transmission flow, the problem that a traditional message service user is unable to correctly receive a return receipt or a reading report from a converged service user is solved and the service experience of the user is improved.

System Embodiment 2

According to an embodiment of the present invention, a system for processing messages is provided.

Figure 5:
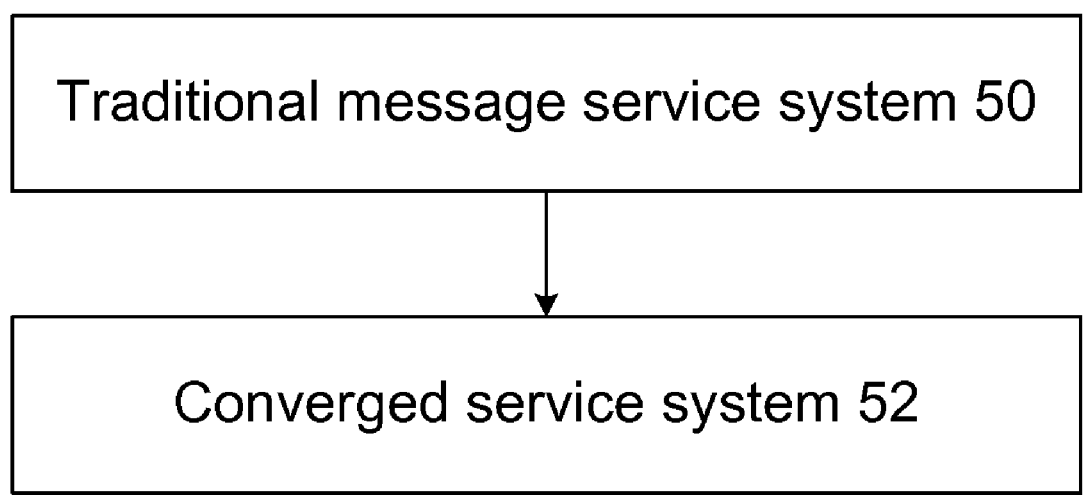
FIG. 5 is a structure block diagram of a system for processing messages according to a system embodiment of the present invention.

FIG. 5 shows a system for processing messages according to the present invention. As shown in FIG. 5, the system for processing messages comprises a traditional message service system 50 and a converged service system 52, wherein the converged service system 52 may be the converged service system as shown in FIG. 4 and will not be described in details here.

As described above, with the help of the method for processing messages, the converged service system and the system for processing messages provided by the is present invention, and through introducing an ID of a traditional message system into a corresponding message transmission flow, the problem that a traditional message service user is unable to correctly receive a return receipt or a reading report from a converged service user is solved and the service experience of the user is improved.

The above-mentioned descriptions are preferred embodiments of the present invention and are not intended to limit the present invention. For those skilled in the art, the present invention may have various changes and modifications. All modifications, equivalent substitutes and improvements made without departing from the spirit and principle of the present invention shall be within the protection scope of the present invention.

What is claimed is:

1. A method for processing messages, which is used for performing a message exchange between a traditional message service user and a converged service user via a converged service system and a traditional message service system, comprising:
    the converged service system receiving a message request sent from the traditional message service user via the traditional message service system and performing a converged service message format conversion on the message request;
    the converged service system determining an ID of the traditional message service system sending the message request according to the message request, and sending the ID of the traditional message service system included in the converted message request to the converged service user;
    the converged service system receiving a predefined service message from the converged service user, wherein the ID of the traditional message service system is included in the predefined service message; and
    the converged service system performing a traditional message service format conversion on the predefined service message and sending the converted predefined service message to a traditional message service system corresponding to the ID of the traditional message service system in the predefined service message.

2. The method according to claim 1, wherein the message request includes an ID of the converged service user, an ID of the predefined service and content of the message.

3. The method according to claim 2, after the converged service system sends the converted message request to the converged service user, the method further comprising:
    the converged service user generating a corresponding predefined service message according to the ID of the predefined service and the content of the message, and sending the predefined service message of the converged service user to the converged service system.

4. The method according to claim 3, wherein the step that the converged service system receives a message request sent from the traditional message service user via the traditional message service system specifically comprises:
    the traditional message service user sends a message request to the traditional message service system; and
    the traditional message service system forwards the message request to the converged service system.

5. The method according to claim 3, after the converged service system sends the converted predefined service message to a traditional message service system corresponding to the ID of the traditional message service system in the predefined service message, the method further comprising:
    the corresponding traditional message service system sending the predefined service message to the traditional message service user.

6. The method according to claim 3, wherein the ID of the predefined service comprises at least one of the following IDs: an ID of a return receipt and an ID of a reading report.

7. The method according to claim 2, wherein the step that the converged service system receives a message request sent from the traditional message service user via the traditional message service system specifically comprises:
    the traditional message service user sends a message request to the traditional message service system; and
    the traditional message service system forwards the message request to the converged service system.

8. The method according to claim 2, after the converged service system sends the converted predefined service message to a traditional message service system corresponding to the ID of the traditional message service system in the predefined service message, the method further comprising:
    the corresponding traditional message service system sending the predefined service message to the traditional message service user.

9. The method according to claim 2, wherein the ID of the predefined service comprises at least one of the following IDs: an ID of a return receipt and an ID of a reading report.

10. The method according to claim 1, wherein the step that the converged service system receives a message request sent from the traditional message service user via the traditional message service system specifically comprises:
    the traditional message service user sends a message request to the traditional message service system; and
    the traditional message service system forwards the message request to the converged service system.

11. The method according to claim 1, after the converged service system sends the converted predefined service message to a traditional message service system corresponding to the ID of the traditional message service system in the predefined service message, the method further comprising:
    the corresponding traditional message service system sending the predefined service message to the traditional message service user.

12. The method according to claim 1, wherein the ID of the predefined service comprises at least one of the following IDs: an ID of a return receipt and an ID of a reading report.

13. A method for processing messages, which is used for performing a message exchange between a user of a first service system and a user of a second service system via the first service system and the second service system, comprising:
    the second service system receiving a message request sent from the user of the first service system via the first service system;
    the second service system determining an ID of the first service system sending the message request according to the message request and sending the user of the second service system the ID of the first service system included in the message request;
    the second service system receiving a predefined service message from the user of the second service system, wherein the ID of the first service system is included in the predefined service message; and the second service system sending the predefined service message to a first service system corresponding to the ID of the first service system in the predefined service message.

14. The method according to claim 13, wherein the message request includes an ID of the user of the second service system, an ID of the predefined service and content of the message.

15. The method according to claim 14, after the second service system sends the message request to the user of the second service system, the method further comprising:

the user of the second service system generating a corresponding predefined service message according to the ID of the predefined service and the content of the message, and sending the predefined service message of the user of the second service system to the second service system.

16. The method according to claim 15, after the second service system sends the predefined service message to a first service system corresponding to the ID of the first service system in the predefined service message, the method further comprising:

the corresponding first service system sending the predefined service message to the user of the first service system.

17. The method according to claim 15, wherein the ID of the predefined service comprises at least one of the following IDs: an ID of a return receipt and an ID of a reading report.

18. The method according to claim 14, after the second service system sends the predefined service message to a first service system corresponding to the ID of the first service system in the predefined service message, the method further comprising:

the corresponding first service system sending the predefined service message to the user of the first service system.

19. The method according to claim 14, wherein the ID of the predefined service comprises at least one of the following IDs: an ID of a return receipt and an ID of a reading report.

20. The method according to claim 13, after the second service system sends the predefined service message to a first service system corresponding to the ID of the first service system in the predefined service message, the method further comprising:

the corresponding first service system sending the predefined service message to the user of the first service system.

21. The method according to claim 13, wherein the ID of the predefined service comprises at least one of the following IDs: an ID of a return receipt and an ID of a reading report.

22. A converged service system, comprising an exchange unit and an exchange selection unit, wherein the exchange unit comprises:
a first receiving module, which is used for receiving a message request sent from a traditional message service user via a traditional message service system;
a first conversion module, which is used for performing a converged service message format conversion on the message request in the first receiving module;
a determination module, which is used for determining an ID of the traditional message service system sending the message request according to the message request in the conversion module;
a first sending module, which is used for sending the message request in the first conversion module to a converged service user, wherein the message includes the ID of the traditional message service system in the determination module;
a second receiving module, which is used for receiving a predefined service message from the exchange selection unit, wherein the predefined service message includes the ID of the traditional message service system;
a second conversion module, which is used for performing a traditional message service format conversion on the predefined service message coming from the second receiving module; and
a second sending module, which is used for sending the predefined service message in the second conversion module to the exchange selection module;
the exchange selection unit comprises:
a third receiving module, which is used for receiving the predefined service message from the converged service user;
a determination module, which is used for determining a corresponding exchange unit according to the ID of the traditional message service system included in the predefined service message; and
a third sending module, which is used for sending the predefined service message to the corresponding exchange unit.

23. The converged service system according to claim 22, further comprising a message and session processing server, which is used for realizing a message exchange between a converged service user and the exchange module, or a message exchange between a converged service user and the exchange selection module.

24. The converged service system according to claim 23, wherein the ID of the predefined service comprises at least one of the following IDs: an ID of a return receipt and an ID of a reading report.

25. A system for processing messages, comprising a traditional message service system, and the converged service system according to claim 24.

26. A system for processing messages, comprising a traditional message service system, and the converged service system according to claim 23.

27. The converged service system according to claim 22, wherein the ID of the predefined service comprises at least one of the following IDs: an ID of a return receipt and an ID of a reading report.

28. A system for processing messages, comprising a traditional message service system, and the converged service system according to claim 27.

29. A system for processing messages, comprising a traditional message service system, and the converged service system according to claim 22.

* * * * *

UNITED STATES PATENT AND TRADEMARK OFFICE
CERTIFICATE OF CORRECTION

| | | |
|---|---|---|
| PATENT NO. | : 8,165,158 B2 | Page 1 of 1 |
| APPLICATION NO. | : 13/122925 | |
| DATED | : April 24, 2012 | |
| INVENTOR(S) | : Li et al. | |

It is certified that error appears in the above-identified patent and that said Letters Patent is hereby corrected as shown below:

On the Title page, item (87) the PCT. Pub. No. should read; WO2010/045770

Signed and Sealed this
Fifth Day of June, 2012

David J. Kappos
*Director of the United States Patent and Trademark Office*